Aug. 25, 1942.    M. KHOLOS    2,294,088
WOVEN BELT
Filed March 29, 1940
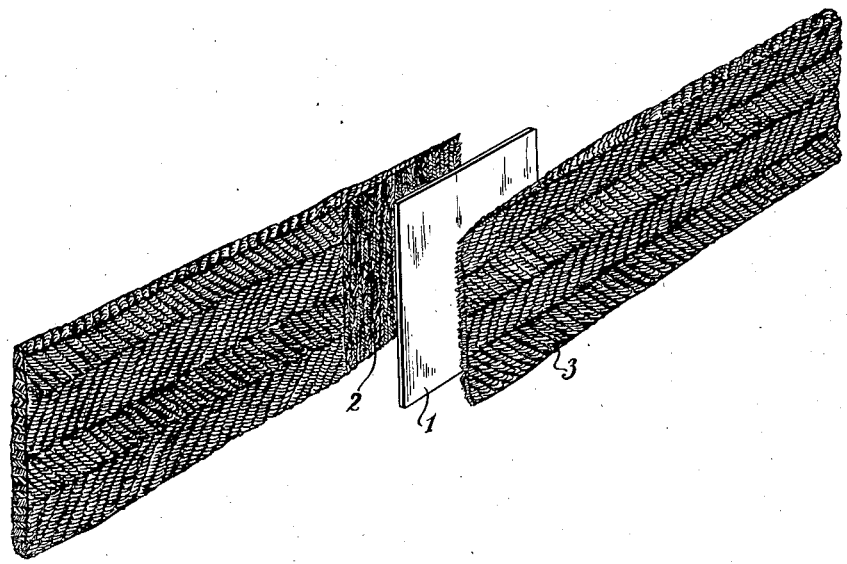
WITNESSES:
INVENTOR
Max Kholos.
BY
Paul E. Friedemann
ATTORNEY Patented Aug. 25, 1942

2,294,088

UNITED STATES PATENT OFFICE 2,294,088

WOVEN BELT

Max Kholos, Pittsburgh, Pa.

Application March 29, 1940, Serial No. 326,677

2 Claims. (Cl. 24—38)

My invention is directed to a specific splice and method of making the same which is particularly adapted for belts, particularly cotton, linen, fiber, or other woven material.

An object of my invention is to provide a joint or splice for a woven type of belt so as to make it into an endless or continuous loop form, which splice is simple in character, but at the same time, will have a resistance against severance which is far greater than similar splices which have been used in the past.

Other objects and advantages will become more apparent from a study of the following specification when considered in conjunction with the accompanying drawing, in which the single figure is a perspective longitudinal sectional detail view of the splice formed in accordance with my invention, and in which the several parts thereof are shown in relative longitudinal positions but spaced apart transversely or, in other words, shown exploded.

Referring to the single figure, numeral 1 denotes a sheet of cellulose nitrate plastic, a substantially waterproof cement which is interposed between the two end portions 2 and 3 of a belt (not shown), which belt is of cotton, linen, fiber, or other woven material and which belt may be made up of a number of plies. The cellulose nitrate plastic is preferably plasticized with camphor, and contains approximately 35 parts of camphor per 100 parts of cellulose nitrate.

The ends of the belt are tapered by a knife or other cutting tool into the shape substantially as shown on the drawing. The opposing tapered surfaces are then coated with a layer of dissolved cellulose nitrate or dissolved cellulose nitrate plastic which may be had by completely dissolving the cellulose nitrate plastic of sheet form, as indicated by numeral 1, in a suitable solvent such as acetone. The coatings are of sufficient quantity to penetrate or to substantially completely fill the interstices between the fibers of the opposed surfaces of the end portions of the belt. The tapered end and to a small extent beyond the tapered end is preferably dipped in the solution. The end portions of the belt are then allowed to dry for a predetermined period of time dependent upon the belt size. For example, in the case of a belt which is 1″ wide by $\frac{1}{16}$″ thick, the ends are tapered preferably ¾″ from each end and are coated with dissolved cellulose nitrate plastic and allowed to dry for 5 to 10 minutes. Then a sheet of cellulose nitrate plastic, indicated by numeral 1 of the same size as the tapered ends of the belt, is dipped into acetone or other suitable solvent for a period of 8 to 10 seconds. While I have used acetone as a solvent with great success, it appears reasonable to assume that other solvents such as methyl-ethyl-ketone; di-acetone alcohol etc., are also suitable. This sheet 1 is then applied between the two ends of the belt and these ends are then clamped between two pieces of fiber (not shown) for approximately 10 minutes. Thereafter the clamps are removed and the belt is aired for approximately 15 minutes.

For wider belts the ends are tapered correspondingly farther back from the extreme ends.

After the belt ends are joined together and have been aired, the belt is ready for use, for example, to act as a driving medium on a pulley. A belt dressing is now applied to the belt which belt dressing is preferably also waterproof and partially oilproof.

In accordance with the above outlined methed of joining belt ends, I am able to make an endless belt right at the machinery, of which the belt forms a part. For example, in cases where it would require removal of a bearing to slip the belt over a pulley, I am able to eliminate such procedure merely by making the joint or splice right at the machine. This, of course, is made possible solely because of the extreme simplicity of my method of forming an endless belt from a single strip of woven material.

It will be apparent that a splice of lesser strength and life can be obtained by eliminating either the preliminary coatings on the ends of the belt or by eliminating the intermediate sheet of cellulose nitrate plastic.

I do not make claims broadly to the use of cellulose nitrate plastic as an adhesive for common materials such as movie-films, for such is well known. I do, however, claim the novel method of forming a splice which is particularly and peculiarly effective on a fabric belt, employing cellulose nitrate plastic of sheet form which is effective to form a joint having remarkable strength and remarkably long life. The precise reason for the unusual and remarkable strength of the joint when cotton or similar cloth material is used and the above outlined method is employed is not entirely clear. For example, belts having joints made in accordance with my invention have been in use for several months with no signs of weakening whereas the ordinary splicing methods, even employing cellulose nitrate plastic (of dissolved form) with the ordinary belt materials such as leather have resulted in joints having a very short life. Tremendous savings have been effected by practicing my method inasmuch as the necessity for using endless-woven belts (which are relatively expensive) is eliminated together with the laborious task and time consumed for installation of an endless-type belt on a pulley or other element of a machine drive.

I am, of course, aware that others, particularly after having had the benefit of the teachings of my invention, may devise other devices and systems of control embodying my invention, and I, therefore, do not wish to be limited to the specific showings made in the drawing and the descriptive disclosure hereinbefore made, but wish to be limited only by the scope of the appended claims and such prior art as may be pertinent.

I claim as my invention:

1. A belt comprising a single strip of woven fibrous material having opposite surfaces adjacent the ends thereof provided with a coating of a plastic cellulose, and a sheet of cellulose plastic surface treated with acetone positioned between said coatings, opposite surfaces of said sheet forming, with the aid of the acetone on its surface, a bond for securing the ends of said belt together to form an endless belt.

2. A belt comprising a single strip of woven fibrous material having opposite surfaces adjacent the ends thereof provided with a coating of plastic cellulose, the ends of said strip being placed in overlapping relationship with said coatings facing each other, said coatings having a plastic cellulose acetone treated bond with each other thereby securing the ends of said strip together to form an endless belt.

MAX KHOLOS.